United States Patent [19]

Graff

[11] E Patent Number: Re. 33,586

[45] Reissued Date of Patent: May 14, 1991

[54] ELASTIC WITH EMBEDDED PULL CORD

[75] Inventor: Paul Graff, Encino, Calif.

[73] Assignee: NFA Corp., Chelsea, Mass.

[21] Appl. No.: 891,365

[22] Filed: Jul. 29, 1986

Related U.S. Patent Documents

Reissue of:

[64] Patent No.: 4,477,928
Issued: Oct. 23, 1984
Appl. No.: 483,367
Filed: Apr. 8, 1983

[51] Int. Cl.[5] ..... A47D 27/00

[52] U.S. Cl. ..... 2/221; 2/237; 2/243 R

[58] Field of Search ..... 2/76, 221, 237, 123, 2/338, 67, 786, 401, 76, 243 R, 201; 139/422, 389, 390, 384 R; 66/170, 202; 87/2, 7; 24/266; 383/72–76, 118

[56] References Cited

U.S. PATENT DOCUMENTS

| | | | |
|---|---|---|---|
| 162,353 | 4/1875 | Culp | 383/118 |
| 240,645 | 4/1981 | Cernstein | 383/76 |
| 735,560 | 8/1903 | Muller | 139/389 X |
| 1,086,630 | 10/1928 | Loveman | 139/384 R |
| 1,475,653 | 11/1923 | Rosenberg | 2/201 |
| 1,921,271 | 8/1933 | Lubin | 2/338 X |
| 1,941,509 | 1/1934 | Allen | 383/76 |
| 2,084,938 | 6/1937 | Busch et al. | 2/237 X |
| 2,118,582 | 4/1947 | Stumpf | 2/76 |
| 2,197,188 | 4/1940 | Lilley | 428/231 |
| 2,392,221 | 1/1946 | Brady | 24/266 X |
| 2,551,044 | 5/1951 | Ottinger et al. | 139/389 X |
| 2,721,331 | 10/1955 | Scheitlin | 2/237 |
| 2,854,670 | 10/1958 | Naccash | 2/76 |
| 2,936,603 | 5/1960 | Lewine | 66/202 |
| 2,998,629 | 9/1961 | Horowitz | 139/384 R |
| 3,167,941 | 2/1965 | Rab | 66/202 |
| 3,172,450 | 3/1965 | Weidhaas | 139/422 |
| 3,236,070 | 2/1966 | Clayton, Jr. | 66/170 X |
| 3,887,968 | 6/1975 | Lynam | 2/237 X |

FOREIGN PATENT DOCUMENTS

| | | | |
|---|---|---|---|
| 1208680 | 1/1966 | Fed. Rep. of Germany | 383/72 |
| 832556 | 9/1938 | France | 383/72 |
| 1474814 | 3/1967 | France | 139/422 |
| 17380 | 8/1898 | Switzerland | 139/384 R |
| 16195 | of 1894 | United Kingdom | 139/422 |
| 1306 | 11/1914 | United Kingdom | 139/389 |
| 632522 | 11/1949 | United Kingdom | 2/67 |
| 1392199 | 4/1975 | United Kingdom | 2/237 |

*Primary Examiner*—Stephen Marcus
*Attorney, Agent, or Firm*—Wolf, Greenfield & Sacks

[57] ABSTRACT

An elastic band with an embedded nonelastic pull cord. When used as a waistband for clothing, it provides both an elastic and drawstring function. The cord's extra length results in a string pulled by the wearer to tighten the article. For an elastic band in the form of cloth, the cord may constitute one of the [intertwined] *intermeshed* threads Woven, knitted or braided elastic may include the cord as part of its fabric. The band with the cord may find use in swimsuits, pants, shirts, and sportswear.

18 Claims, 4 Drawing Sheets

ELASTIC WITH EMBEDDED PULL CORD

Matter enclosed in heavy brackets [ ] appears in the original patent but forms no part of this reissue specification; matter printed in italics indicates the additions made by reissue.

BACKGROUND

Articles of clothing commonly incorporate elastic bands. Additionally, many of these items with elastic also utilize a drawstring for pulling the clothing tightly around the body.

During manufacture, the incorporation of elastic and drawstring into an article of clothing currently includes several steps. Juxtaposition of the elastic and the material of the clothing occurs in the first step. The second step requires feeding a nonelastic drawstring through a channel created by affixing layers of the material together. This drawstring allows the wearer to tighten the clothing. Occasionally, the drawstring's end attach to the elastic or to the material of thus channel as a third step. As a result, the manufacturer, following this process to implant both elastic and a drawstring in an article of clothing, incurs appreciable production and labor costs.

Several problems normally arise with employing both elastic and a drawstring in this manner. Especially when situated within a channel created by creased layers of the material, the drawstring tends to lose its desired position. As the article of clothing receives wear, the elastic has a tendency to roll, entangling the drawstring. This enfolding of the elastic and displacement of the drawstring becomes cumbersome and uncomfortable for the wearer.

Further, pulling one end of the drawstring can cause the other end to enter the channel in the material and become lost. Carried to extremes, the cord completely separates from the article of clothing and possibly becomes lost. Thus, both the product and its method of manufacture have room for improvement.

SUMMARY

The use of an elastic band with an embedded pull cord eliminates several steps in the manufacture of an article of clothing employing a drawstring. The resulting simplified production realizes a reduction of manufacturing time and labor costs.

As usual, the elastic band includes an elongated web of material stretchable in its longitudinal direction. A substantially nonelastic pull cord extends along and intermeshes with the elastic web. The cord has an orientation along the web's longitudinal direction.

The pull cord should possess a length greater than the elastic band in its unstretched position. This excess provides a loop which the wearer may utilize as a pull cord to tighten the article of clothing. The ends of the cord may firmly attach to the band or the article of clothing incorporating the cord. The loop then forms at an intermediate position on the pull cord. The loop itself then has no ends which can become lost in the clothing itself.

The construction of the elastic band with its embedded pull cord generally requires the forming of an elongated web of elastic material. This materials shows its elastic properties in its longitudinal direction. The process then involves intermeshing a substantially nonelastic pull cord with a portion of the web of the elastic material. The pull cord extends in the longitudinal direction of the web. The cord must have a greater length than the portion of the web in which it finds itself embedded.

The elastic band with the embedded pull cord generally forms part of an article of clothing. The band adheres to the clothing around the perimeter defining an opening for the clothing such as its waist. The extra cord, drawn into a loop, acts as a drawstring for the piece of clothing.

The making of the clothing involves placing an elastic band in proximity to the opening's perimeter. The process continues with the affixing of the web to the cloth. This generally proceeds through the normal sewing. It could, alternatively, simply result from enclosing the band within a fold of the clock. Lastly, the process requires the intermeshing of the substantially nonelastic pull cord into a portion of the web. This step, however, may precede the affixation of the elastic web or band to the cloth.

Typically, the pull cord can form part of a woven, knitted, or braided elastic band. The cord may represent an integral thread of the band or an extra thread intermeshed with the band.

BRIEF DESCRIPTION OF THE FIGURES

[FIG. 6]

DETAILED DESCRIPTION

Figure 1:
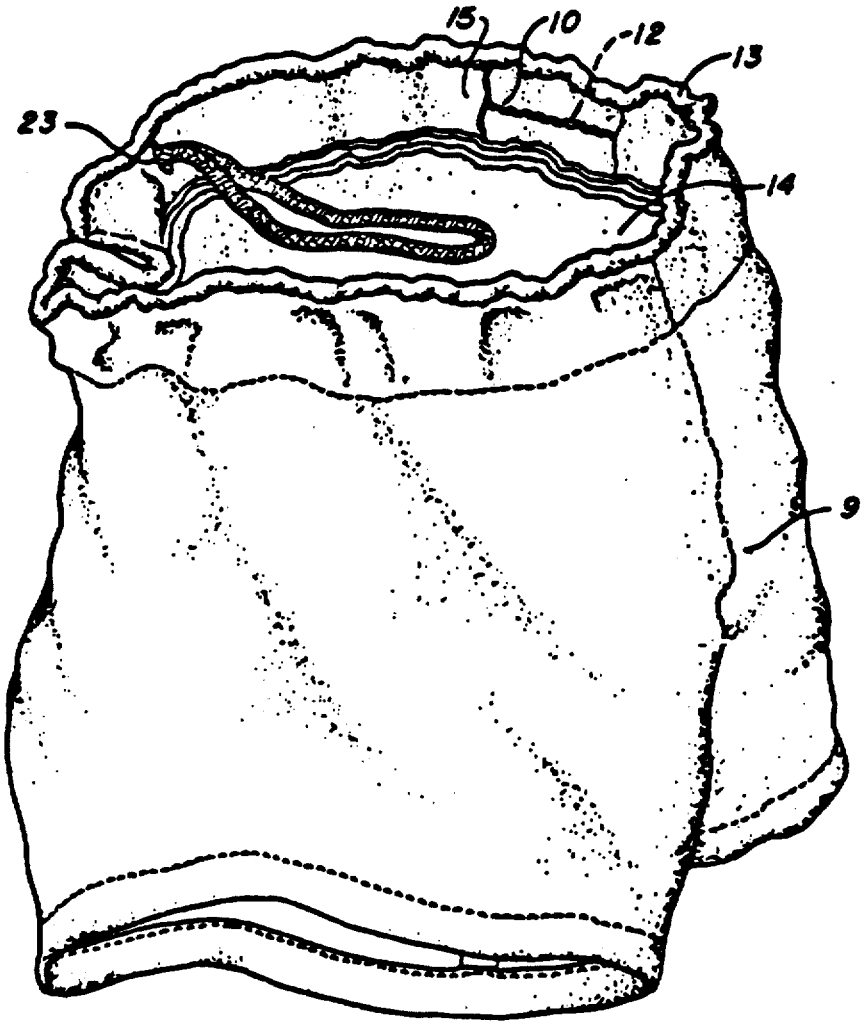
FIG. 1 shows an article of clothing, partially cut away, utilizing an elastic band with an intermeshed pull cord.

The pair of shorts 9 in FIG. 1 includes the elastic band to hold it around the wearer's waist. The shorts 9 also have the drawstring 12 to assure a tight fit.

As usual, the band lies adjacent to the perimeter 13 of the pant's waist opening 14. The layer 15 of folded material of the shorts 9 forms a channel 16 for the elastic band 10 with its string 12.

Figure 2:
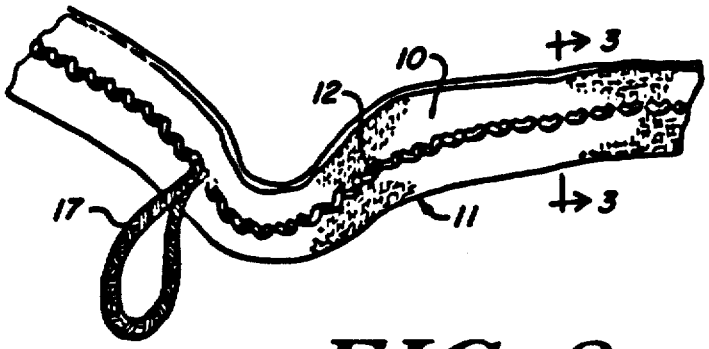
FIG. 2 illustrates an elastic band with an embedded pull cord.

The elastic band 10, shown in FIG. 2, includes the woven elastic web 11. The pull cord 12 lies embedded within the band 10. The extra length of the cord 12 forms the loop 17. The wearer, by [pullling] *pulling* on the loop 17, after [is] *it* is cut in the middle, and subsequently tying a knot, may secure the pants 9 to herself.

Figure 3:
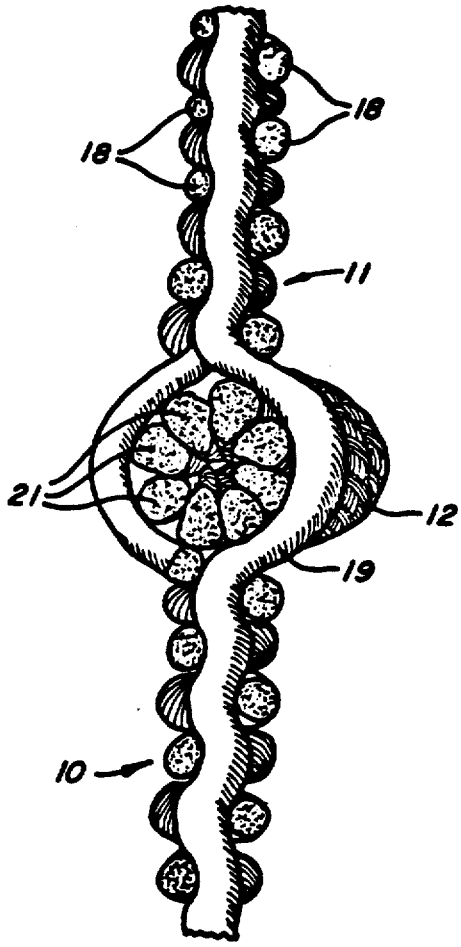
FIG. 3 gives a partial cross-sectional view, in magnification, taken along the line 3—3 of the elastic band of FIG. 2.
Figure 4:
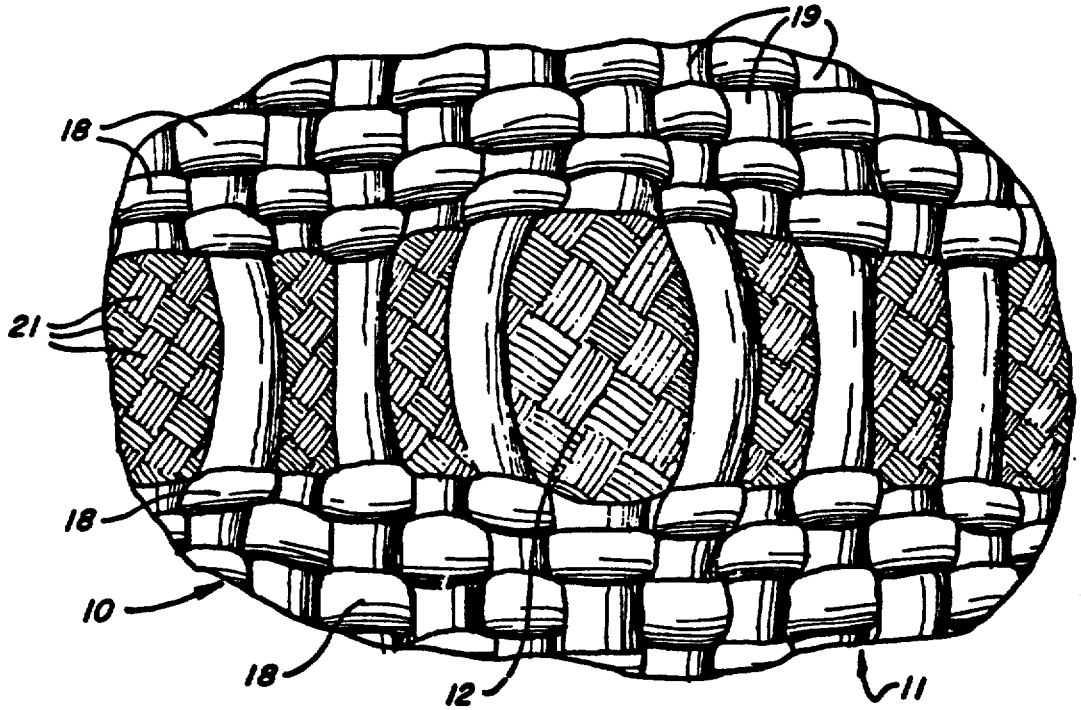
FIG. 4 provides an enlarged view of a pull cord constituting one of the warp threads of the woven elastic band.

As seen in FIGS. 3 and 4, the woven elastic band 10 results from the [intermeshing] *interlacing* of the warp 18 with the woof 19. With the band 10 displaying its stretching qualities in its longitudinal direction, the warp threads 18 must also have an elastic composition. The woof 19 may also display elastic qualities, which would allow the stretching of the band 10 in its transverse direction. Most woven elastic, however, need only stretch in the former manner.

The pull cord 12 itself may have any typical construction. The figures suggest that the cord 12 has a structure resulting from the braided threads 21. However, almost any type of pull cord that finds use will suffice for the band 10. Generally, the cord 12 does not display elastic properties. Accordingly when the wearer tightens the loop 17 and forms a knot, the article will securely adhere to her. This would apply not only for the waist of pants, but also for the cuffs of either pants legs or sleeves as well as possibly the bottom of a jacket or shirt.

In [forcing] *forming* the woven band 10, the machine places the elastic under tension as it effectuates the weaving process. As shown in FIGS. 3 and 4, however, the cord 12 represents one of the warp threads in the band 10. Furthermore, the machine includes the cord 12 with the elastic warp threads 18 under tension, or stretch. Releasing the tension on the band 10 after its manufacture permits it to contract. In other words, it loses part of its length. The [core] *cord* 12, not having an elastic nature, does not similarly contract. Rather, it compacts into little bunches along the band 10. This gives the cord 12 a greater length than the remainder of the elastic band 10 in its unstretched condition. Grabbing the cord 12 at some particular point and pulling it allows this extra length to form the loop 17 shown in FIGS. 1 and 2.

In forming the shorts 9 of FIG. 1, the manufacturer will grab the cord 12 at the opening 23 in the covering fold of material 15. Pulling the cord 12 through the opening 23 places the loop 17 at the particular location where the wearer can facilely make use of it. The task of pulling the extra cord 12 to form the loop 17 at the opening 23 represents a much easier and quicker task than threading a separate draw cord around the entire waist of the shorts 9.

Even with the loop 17, an excess amount of the pull cord 12 remains and forms [pleats] *bunches* within the elastic band 10. Nonetheless, the loop 17 will have sufficient length to make it readily accessible to the wearer.

As stated above, the elastic band seen in FIGS. 1 to 4 results from a weaving process. The band 25 in FIG. 5 utilizes the threads 26 [intertwined] *interloped* through the knitting process. The elastic band 25 includes the elongated stretchable fibers 27 which [provides] *provide* it with its elastic qualities. The drawstring 28 also intermeshes with the knitted threads 26 to form part of the band 25.

Figure 6B:
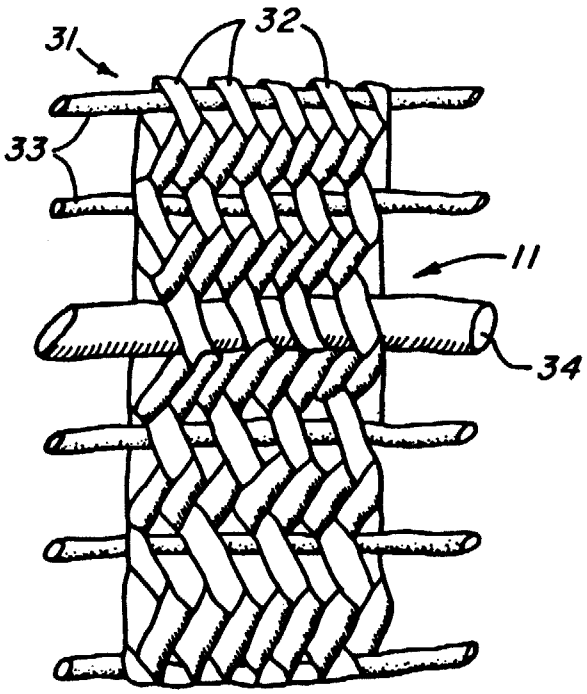
*FIG. 6B shows a braided elastic band having an embedded pull cord which is inserted in place of one of the elastic threads.*
Figure 6A:
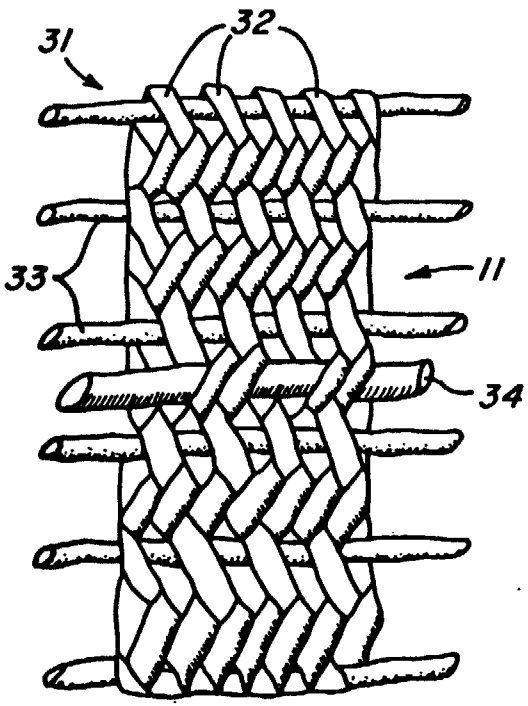
*FIG. 6A* shows a braided elastic band having an embedded pull cord.

Similarly, FIG. 6 shows the elastic band 31 formed from the threads 32 braided about the longitudinal elastic fibers 33. The pull cord 34 intermeshes with the fibers 33.

Figure 5B:
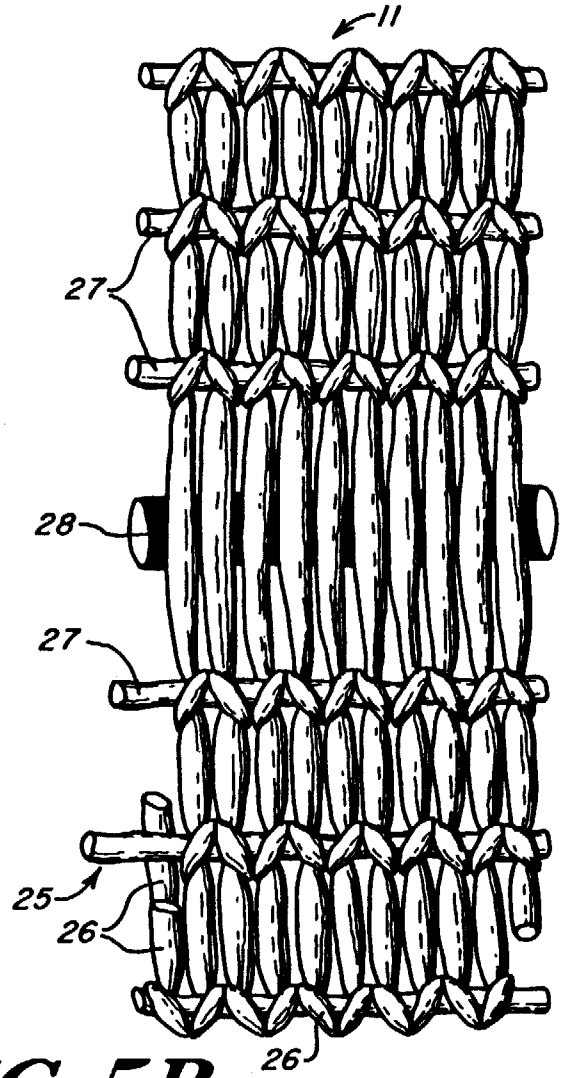
*FIG. 5B shows a knitted elastic band having an imbedded pull cord which is inserted in place of one of the elastic threads.*
Figure 5A:
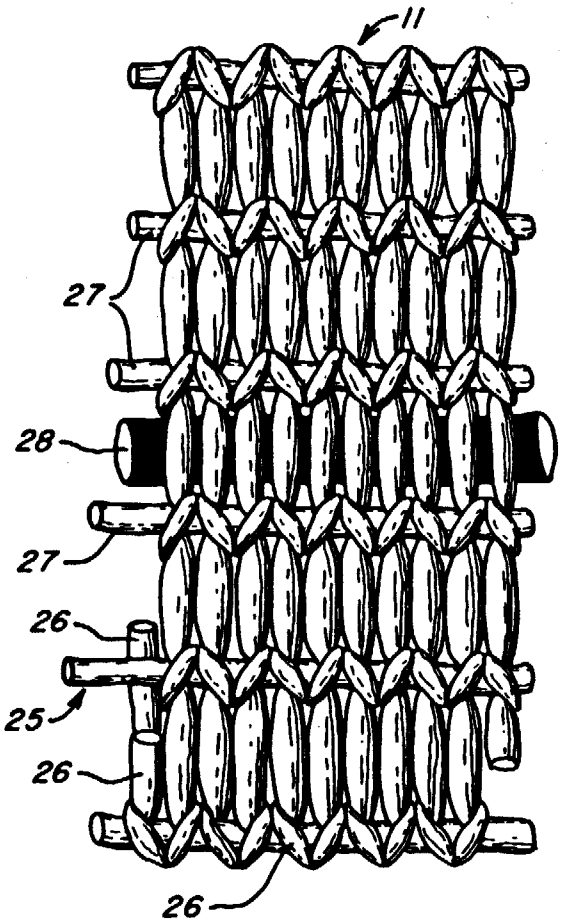
[FIG. 5] *FIG. 5A* gives a knit elastic band with an embedded pull cord.

The elastic bands 25 and 31 in FIGS. 5 and 6, respectively, do not form under tension. Accordingly, simply releasing the tension does not result in the required excess of the pull cord 28. Rather, the machine that forms the bands 25 and 31 must insert greater amounts of the cords [27] *28* and 34 than the lengths of the respective bands would normally require. This produces the excess length resulting in the [pleated] *bunched* cords 28 and 34. This additional length thus forms the loops which permit their use as drawstrings.

Furthermore, FIGS. 5 and 6 simply show the cords 28 and 34 as additional elements inserted into and intermeshed with the knitted and braided threads 26 and 32. For an appropriate style of knitting or braiding, the pull cords 28 and 34 could constitute one of the knitted or braided threads themselves.

Accordingly, what is claimed is:

1. An elastic band comprising:

(A) an elongated web of material comprising interconnected elastic threads generally oriented in a longitudinal direction, said web being elastic in its longitudinal direction, and (B) a pull cord extending in said longitudinal direction along a portion of said web, said cord being in the place of one of said elastic threads and having a length greater than the length in said longitudinal direction of said portion of said web in its unstretched condition, said pull cord being bunched at spaced intervals to allow said cord to be grasped and partially pulled out of said portion of said web.

2. The band of claim 1 wherein said web is composed of warp and woof threads.

3. The band of claim 1 wherein said web is knitted.

4. The band of claim 1 wherein said web is of braided construction.

5. A method of constructing a band comprising:

(A) forming an elongated web of material elastic in as longitudinal direction by interconnecting elastic threads having an orientation in said longitudinal direction;

(B) intermeshing with a portion of said web in said longitudinal direction a pull cord having a length greater than the length of said portion of said web in said longitudinal direction in its unstretched condition; and (C) bunching said pull cord at spaced intervals.

6. The method of claim 5 wherein said elastic threads are [interconnected by weaving them] *woven* into *a* cloth of warp and woof threads, said elastic threads being [said] warp threads.

7. The method of claim 6 wherein said cord is intermeshed into said portion of said web by weaving said cord in place of one of the warp threads of said cloth.

8. The method of claim 8 wherein said elastic threads are knitted together.

9. The method of claim 8 wherein said cord is knit into said portion of said web in place of one of said elastic threads.

10. The method of claim 5 wherein said elastic threads are braided together.

11. The method of claim 10 wherein said cord is braided into said portion of said web in place of one of said elastic threads.

12. An article of clothing comprising:

(A) a section of cloth having a perimeter defining an opening;

(B) an elastic web [adhered] *affixed* to said section of cloth at said perimeter and elongated in a longitudinal direction, *said elastic web being formed of elastic threads extending in said longitudinal direction*; and (C) a pull cord extending in said longitudinal direction and being intermeshed with a portion of said web, *said pull cord being movable with respect to said web in said longitudinal direction and being disposed in place of one of said elastic threads forming said elastic web*, said cord having a length greater than the length in said longitudinal direction of said portion of said web in its unstretched condition, said pull cord being bunched at spaced intervals.

13. The article of claim 12 wherein a segment of said section of cloth substantially encloses said elastic web, said section of cloth having a hole through which said cord may be grasped and partially pulled out of said portion of said web.

[14. A method of making an article of clothing formed from a section of cloth having a perimeter defining an opening, said method comprising:

(A) placing an elongated elastic web in proximity to and along said perimeter, said elastic web comprising interconnected elastic threads generally oriented in a longitudinal direction generally parallel to said perimeter of said opening;

(B) affixing said web to said cloth; and (C) intermeshing along the longitudinal direction of said elastic web a pull cord within a portion of said elastic web, said cord being in the place of one of said elastic threads of said elastic web, said cord having a length greater than said portion of said elastic web when in its unstretched condition, said pull cord being branched at spaced intervals to allow said cord to be grasped and partially pulled out of said portion of said web.]

15. An elastic band comprising:

(A) an elongated web of material comprising [interconnected] elastic threads generally oriented in a longitudinal direction, said web being elastic in its longitudinal direction; and a pull cord extending in said longitudinal direction along a portion of said web, said cord being *disposed between two adjoining elastic threads* in addition to said elastic threads and having a length greater than the length in said longitudinal direction of said portion of said web [and being connected thereto] in its unstretched condition, said pull cord being bunched at spaced intervals to allow said cord to be grasped and partially pulled out of said portion of said web.

16. The band of claim 15 wherein said web is composed of warp and woof threads.

17. The band of claim 15 wherein said web is knitted.

18. The band of claim 15 wherein said web is of braided construction.

*19. A method for making an article of clothing formed from a section of cloth having a perimeter defining an opening, said method comprising:*

*forming an elongated elastic web comprised of elastic threads generally oriented in a longitudinal direction in the direction of elongation;*

*intermeshing a pull cord with a portion of said elastic web in the longitudinal direction of said elastic web, said pull cord being in the place of one of said elastic threads of said elastic web, said pull cord having a length greater than said portion of said elastic web when in its unstretched condition, said pull cord being bunched at spaced intervals to allow said cord to be grasped and partially pulled out of said porion of said web;*

*placing said elongated web in proximity to and along the perimeter of the cloth; and*

*affixing said web to the cloth.*

* * * * *